(12) United States Patent
Jakovljevic (10) Patent No.: US 6,830,259 B2
(45) Date of Patent: Dec. 14, 2004

(54) PEDAL-TYPE DRIVING DEVICE SUITABLE FOR BICYCLE

(76) Inventor: Petar Jakovljevic, 16-2601 Matheson Blvd. E., Ontario (CA), L4W 5A8

( * ) Notice: Subject to any disclaimer, the term of this patent is extended or adjusted under 35 U.S.C. 154(b) by 0 days.

(21) Appl. No.: 10/358,692

(22) Filed: Feb. 5, 2003

(65) Prior Publication Data

US 2004/0150186 A1 Aug. 5, 2004

(51) Int. Cl.$^7$ ............................................. F16H 1/28
(52) U.S. Cl. ..................... 280/261; 280/260; 280/259
(58) Field of Search ................................ 281/261, 260, 281/259, 262; 74/594.3, 594.2, 594.1, 594.4

(56) References Cited

U.S. PATENT DOCUMENTS

| | | | | |
|---|---|---|---|---|
| 3,888,136 A | * | 6/1975 | Lapeyre | 74/594.1 |
| 4,446,754 A | * | 5/1984 | Chattin | 74/594.3 |
| 4,560,182 A | | 12/1985 | Yamaguchi | 280/257 |
| 4,816,009 A | | 3/1989 | Philipp | 474/69 |
| 4,882,945 A | * | 11/1989 | Trevizo | 74/594.3 |
| 4,960,013 A | * | 10/1990 | Sander | 74/594.3 |
| 4,986,556 A | | 1/1991 | Hartmann | 280/260 |
| 5,095,772 A | * | 3/1992 | Fortson | 74/594.3 |
| 5,207,119 A | * | 5/1993 | Garneau | 74/594.3 |
| 5,228,710 A | | 7/1993 | Lu | 280/260 |
| 5,271,635 A | | 12/1993 | Lu | 280/275 |
| 5,816,600 A | * | 10/1998 | Matsuura | 280/260 |
| 5,879,017 A | | 3/1999 | Debruin | 280/259 |
| 6,152,471 A | | 11/2000 | Kang et al. | 280/261 |
| 6,487,933 B2 | * | 12/2002 | Orioli et al. | 74/594.3 |

* cited by examiner

*Primary Examiner*—Lesley D. Morris
*Assistant Examiner*—Tony Winner
(74) *Attorney, Agent, or Firm*—Gifford, Krass, Groh, Sprinkle, Anderson & Citkowski, P.C.

(57) ABSTRACT

A pedal-type driving device suitable for a bicycle, including a main shaft rotatable about a central axis and a chain sprocket mounted about the main shaft for rotation therewith. There are two power transmission units mounted at opposite ends of the main shaft and each has a non-rotating first sprocket connectible to a support structure of the bicycle, a rotatable planetary second sprocket spaced radially outwardly from the first sprocket, a pedal, a crack connecting the pedal to the second sprocket, and a flexible drive member such as a timing belt extending around the first and second sprockets. The distance of each pedal from the central axis varies substantially as the pedals are moved about the central axis and this provides greater rotational torque to the shaft on the downward stroke of each pedal.

18 Claims, 5 Drawing Sheets

PEDAL-TYPE DRIVING DEVICE SUITABLE FOR BICYCLE

BACKGROUND OF THE INVENTION

This invention relates to pedal-type driving devices, particularly such devices suitable for bicycles, and bicycles equipped with these driving devices.

It is well known that standard bicycles are driven using foot operated pedals that are able to turn, by means of a crank arrangement, one or more chain sprockets that are rotatably mounted on the bicycle frame. A continuous chain extends from the chain sprocket or one of the chain sprockets to a chain sprocket mounted at the rear wheel axle. In many cases, there may be a plurality of chain sprockets of different sizes at the rear wheel axle and a gear changing mechanism is provided for moving the chain from one of the sprockets to another. A number of proposals have been made in the past for improving the operational performance of a bicycle by varying the effective length of the crank arm to which each pedal is attached. If the effective length of the crank arm can be increased during the downward stroke phase of each pedal, then the amount of rotational torque applied to the driving chain sprocket with the same amount of exertion or work by the bicycle rider is also increased. However, as far as the applicant is aware, these prior attempts to vary the length of the crank arm attached to each pedal have not met with commercial success, possibly due to mechanical inefficiencies or problems.

One recent patent which teaches a variable length crank arm for a bicycle is U.S. Pat. No. 5,879,017 which issued Mar. 9, 1999 to J. N. Debruin. In this known bicycle drive, the crank arms or crankshafts are secured to opposite ends of an existing sprocket shaft of the bicycle. Each crankshaft has an elongated slot extending a length thereof and has a sliding bearing coupled with an upper end thereof. Each sliding bearing has a roller disposed on a rear surface thereof and the two rollers are coupled with a pair of circular races which in turn are coupled with the existing sprocket shaft. The pedals are mounted within the elongated slots of the crankshafts and they are attached by shaft portions to the sliding bearings.

U.S. Pat. No. 6,152,471 which issued Nov. 28, 2000 to Byung Nam Kang et al. teaches two different versions of a variable pedal driving device for a bicycle. A main drive shaft extends through a short shaft pipe. Two power transmission units and crank shafts are respectively installed on opposite ends of the main shaft. The two pedals are mounted on respective, hollow slide members which are slidable along respective crankshafts. Rotary levers are attached by means of shafts to respective slide members. One end of each power transmission unit is fixedly connected to the shaft pipe so as to extend radially therefrom. The power transmission units each include a sprocket which is connected to another sprocket by means of a continuous chain. With this arrangement, when each pedal is driven in the forward direction, the crankshaft is caused to extend out to a maximum distance from the main shaft to provide more efficient transmission of foot power to the bicycle.

It is an object of the present invention to provide an improved pedal-type driving device which can be used to drive a wheeled vehicle such as a bicycle and which is reliable and easy to use.

It is a further object of the present invention to provide an improved pedal-type driving device which employs two power transmission units, one at each end of a main drive shaft with each unit including a planetary sprocket, a pedal, and a crank arm connecting the pedal to the sprocket wherein each power transmission unit allows the distance of the pedal from the central axis of the main shaft to vary substantially as the pedals are moved about the central axis during use of the driving device.

SUMMARY OF THE INVENTION

According to one aspect of the invention, a driving device includes a main shaft having first and second ends and rotatable about a main central axis thereof and a chain sprocket co-axial with the main shaft and mounted for rotation with the main shaft, the chain sprocket being adapted to drive a continuous drive chain. There are also two power transmission units, each of which is mounted at a respective one of the first and second ends of the main shaft, with each power transmission unit including an elongate crank having a predetermined, fixed length, a pedal attached to the crank at a fixed location at an outer end of the crank, a flexable continous drive member, a planetary sprocket fixedly attached to an opposite end of the crank for movement therewith and operatively connected to the continuous drive member. The planetary sprocket has a central axis which is substantially parallel to the main central axis but spaced therefrom. This sprocket is rotatable in an orbit around the main central axis upon movement of its respective pedal. There is also a non-rotating sprocket coaxial with the main shaft and operatively connected to the continuous drive member. The distance of each pedal from the main central axis is varied by its respective power transmission unit as each pedal is moved about the main central axis.

Preferably, each power transmission unit includes a rotatable sprocket supporting member on which the planetary sprocket is mounted for relative rotation therewith and one of the sprocket supporting members is fixedly connected to one side of the chain sprocket. Furthermore, in an preferred embodiment, each pedal is fixedly and non-rotatably connected to its respective crank member.

According to another aspect of the invention, a pedal-type driving device suitable for a bicycle includes a main shaft having first and second ends and rotatable about a central axis thereof and a chain sprocket adapted for mounting about the main shaft in a coaxial manner for rotation therewith. The chain sprocket is engageable with a chain to drive a driving wheel of the bicycle. There are also two power transmission units, each of which is mounted at a respective one of the first and second ends of the main shaft. Each transmission unit comprises a non-rotating first sprocket connectable to an adjacent support structure of the bicycle during use of the driving device, a rotatable, planetary second sprocket spaced radially outwardly from the first sprocket, a pedal, a crank connecting the pedal to the second sprocket, and a flexible, continuous drive member extending around and between the first and second sprockets and adapted to rotate the second sprocket when the attached pedal is rotated about the main shaft. In addition, a sprocket supporting member is fixedly attached to a respective one of the ends of the main shaft and is attached to and supports the second sprocket so as to allow rotation of the second sprocket relative to the supporting member. The chain sprocket is adapted for mounting on one of the power transmission units for rotation with the sprocket supporting member of the one power transmission unit. The distance of each pedal from the central axis varies substantially as the pedals are moved about the central axis during use of the driving device. The pedals and their attached cranks are able to provide greater rotational torque to the main shaft during a driving phase of the rotation when the pedals are at a greater distance from the central axis.

In a preferred embodiment, the sprocket supporting member of one of the transmission units is connectable by threaded fasteners to one side of the chain sprocket. Preferably, the sprocket supporting member is a relatively flat housing that surrounds its respective continuous drive member and the first sprocket.

According to still another aspect of the invention, there is provided a foot-powered, wheeled vehicle having a support frame, a steerable front wheel, and at least one, driven rear wheel connected to at least one driven sprocket for rotation therewith. A main drive shaft is rotatably mounted in the support frame and has first and second ends. A chain sprocket coaxial with the drive shaft is mounted for rotation with the drive shaft. A continuous chain extends between and operatively connects the chain sprocket and the at least one driven sprocket. The improvement in this vehicle is the use of two power transmitting devices, each of which is mounted at a respective one of the first and second ends of the drive shaft. Each of these power transmitting devices includes an elongate crank member having a fixed length, a pedal attached to the crank member at a fixed location at an outer end of the crank member, and a sprocket fixedly attached to an opposite end of the crank for movement therewith. The sprocket has a central axis of relative rotation which is substantially parallel to a central axis of the main drive shaft but is spaced therefrom. This sprocket is rotatable in an orbit around the central axis of the main drive shaft. When the vehicle is driven, the distance of each pedal from the central axis of the main drive shaft is varied by its respective power transmission device as the latter is rotated by its pedal and reaches a maximum distance during a downward stroke of the pedal.

In a preferred embodiment of this vehicle, the power transmitting device includes a continuous timing belt which extends around and is operatively connected to the sprocket and a non-rotatable, second sprocket that is co-axial with the main drive shaft and that is fixedly connected to the support frame.

Further features and advantages will become apparent from the following detailed description taken in conjunction with the accompanying drawings.

DETAILED DESCRIPTION OF PREFERRED EMBODIMENTS

Figure 1:
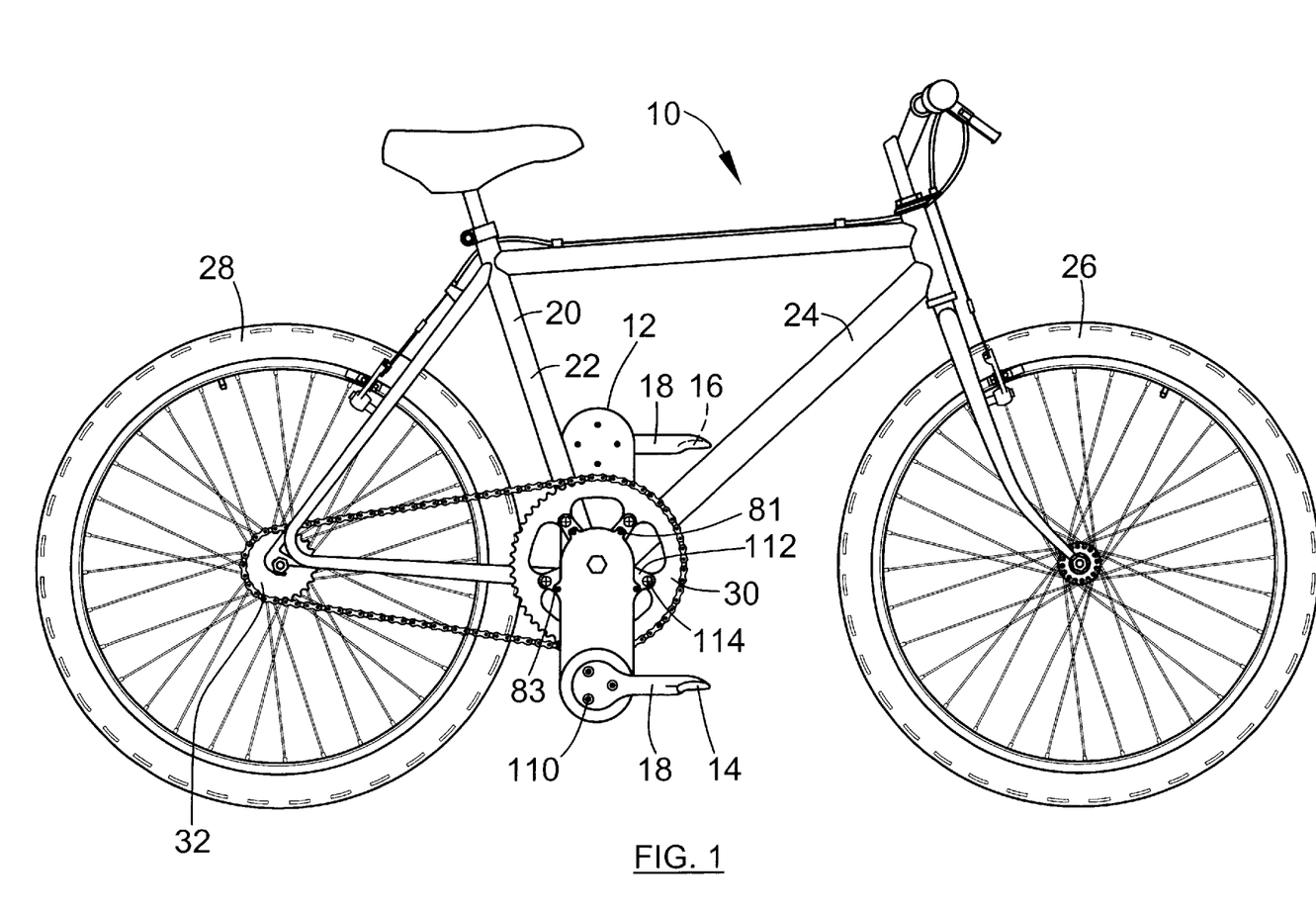
FIG. 1 is a side view of a bicycle equipped with a pedal-type driving device constructed in accordance with the invention.

FIG. 1 illustrates an otherwise conventional bicycle 10 that is equipped with a pedal-type driving device indicated generally at 12 constructed in accordance with the invention. As in a conventional bicycle drive system, the bicycle 10 is equipped with a pair of foot pedals 14, 16 and each of these is mounted on a crank arm or crank 18 which can be made of a suitable metal such as stainless steel or aluminum or aluminum alloy. With respect to the bicycle itself, it can include a standard support frame 20 that can include downwardly sloping frame members 22 and 24, a steerable front wheel 26, a driven rear wheel 28, and the usual handle bar for steering the front wheel. Also, as in many conventional bicycles, there is a chain sprocket 30 which has a continuous series of teeth about its perimeter. A continuous drive chain extends around and is engaged by the chain sprocket 30 and this chain is used to drive the rear wheel 28 in a manner known per se. Located at the rear axle of the rear wheel and connected thereto is at least one driven sprocket 32. It will be understood that if the bicycle 10 is a multiple speed bicycle, there can be a series of driven sprockets mounted at the rear axle and there can be a shifter (not shown) for shifting the position of the chain from one of the sprockets to another. For purposes of the present description, only one driven sprocket 32 will be hereinafter referred to and described but it will be understood that the pedal-type drive system of the present invention can be used with a bicycle having a plurality of driven sprockets at the rear wheel axle.

Figure 3:
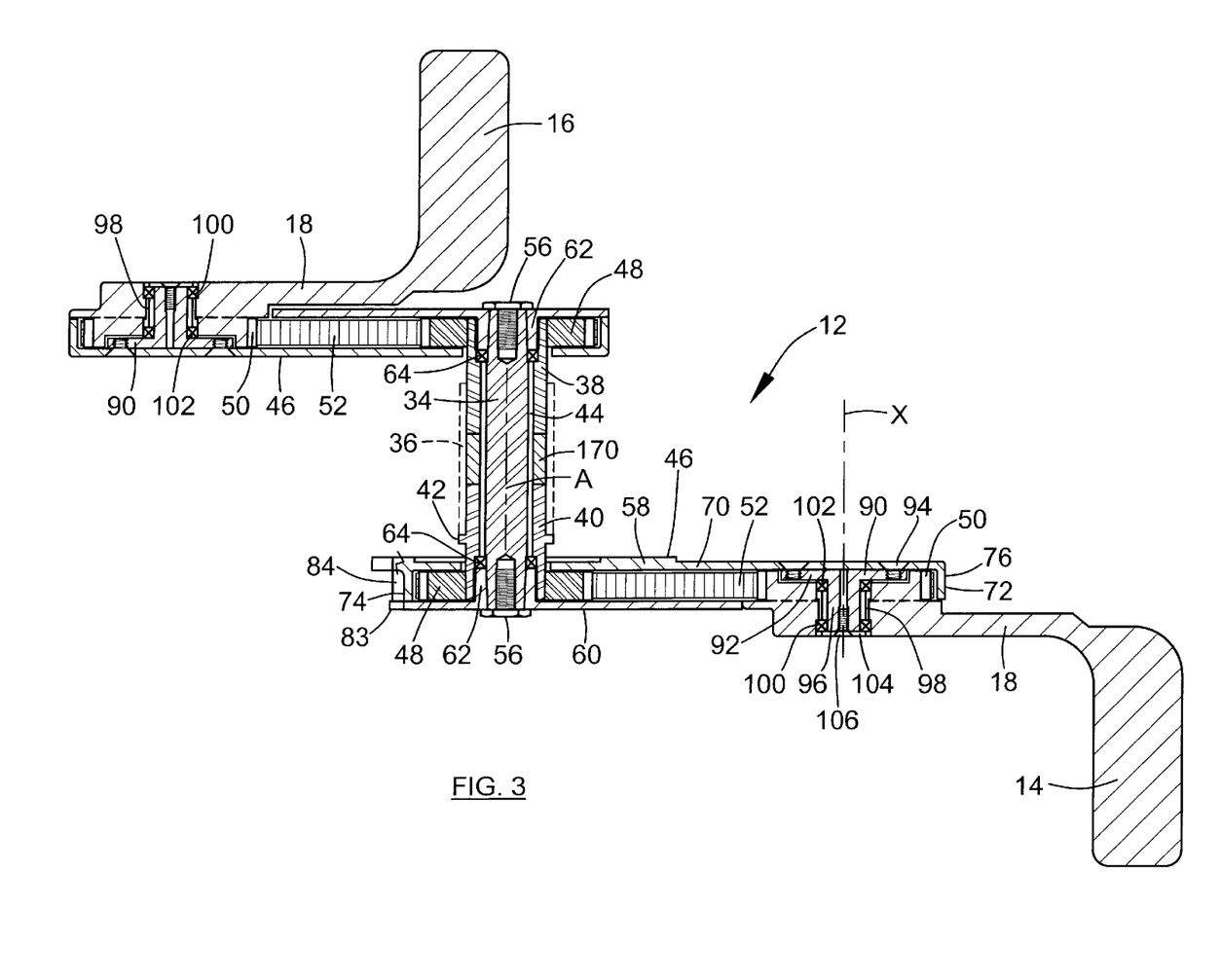
FIG. 3 is a cross-sectional plan view of the pedal-type driving device, this view being taken through the axis of rotation of the main shaft.

Turning now to a detailed discussion of one preferred embodiment of the pedal-type driving device 12 of the invention, there can be seen in FIG. 3 a main drive shaft 34 which is rotatable about a central axis indicated at A. It will be understood that this main shaft is supported at the usual position on the bicycle frame at the bottom ends of the frame members 22 and 24. The main shaft can extend through a horizontal passageway formed in support sleeve 36 which can be part of the overall bicycle support frame 20 and which can connect together the two frame members 22, 24, for example, by being welded thereto. Two, substantially cylindrical, metal bushings 38 and 40 can be secured in and supported by the sleeve 36 with each bushing extending into a respective one of the two open ends of the sleeve. Each of these bushings can be made from cast iron, aluminum or aluminum alloy. One of the bushings can be provided with an annular flange or rib 42 which projects outwardly and acts as a locating stop to correctly position the bushing 40 in the sleeve 36. It will be understood that these bushings are non-rotatably mounted in the sleeve and an annular gap 44 is provided between the interior surfaces of the bushings and the main shaft. A suitable spacer 170 can e positioned between the two bushings and helps to correctly position the second bushing 38 relative to the bushing 40 and relative to the sleeve 36.

In addition to the aforementioned pedals and cranks, the pedal-type driving device 12 includes two power transmission units indicated generally at 46, each of which is mounted at a respective one of the two ends of the main drive shaft 34. Each of these transmission units preferably includes a non-rotating first sprocket 48, a rotatable planetary second sprocket 50 spaced radially outwardly from the first sprocket, and a flexible, continuous drive member 52 extending around and between the first and second sprockets and adapted to rotate the second sprocket when the attached pedal 14 or 16 is rotated about the main shaft. The preferred continuous drive member is a flexible timing belt which can be of standard construction and sized to fit its respective power transmission unit 46. In the illustrated preferred embodiment, the first sprocket is fixedly attached to an adjacent support structure of the bicycle, namely the adjacent outer end section of the bushing 38, 40. Preferably, the first sprocket is fixedly mounted by a press fit on its respective bushing 38, 40. Each power transmission unit also preferably includes a sprocket supporting member indicated generally at 54 and fixedly attached to a respective one of the two ends of the main shaft 34. This supporting member is attached to and supports the second sprocket 50 so as to allow rotation of the second sprocket relative to the supporting member 54. As illustrated in FIG. 3, the supporting member 54 can be attached to the end of the main shaft by means of a threaded fastener 56. The fastener 56 can take the form of a suitable screw or bolt which is screwed into a threaded hole formed in the end of the shaft and which has a head of larger diameter than the end of the shaft. As illustrated in FIG. 3, the sprocket supporting member 54 is a relatively flat housing that surrounds its respective continuous drive member 52 and its respective first sprocket 48. Preferably this housing comprises a inner main housing section 58 and an outer main housing section 60. It is the outer main housing section 60 which is fixedly attached to an adjacent one of the ends of the main shaft 34. As illustrated, the outer main housing section can be formed with an inwardly projecting, annular shaft connecting section 62 through which an end section of the main shaft extends. The passageway formed in this shaft-connecting section 62 is tapered slightly in the outwards direction as is the annular surface of the end section of the shaft. This taper makes it easier to insert the end section of the shaft into the housing section and it also ensures a tight fit between these two members. Two sets of ball bearings 64 are provided near opposite ends of the main shaft and these bearings are held in place by retaining rings mounted on the shaft and are located between the main shaft and an adjacent one of the bushings 38, 40. It will thus be appreciated that since each power transmission unit 46 is fixedly attached to its respective end of the main shaft, the power transmission unit will rotate with the main shaft. In addition, as explained further hereinafter, the chain sprocket 30 is fixedly attached to the side of one of the power transmission units and rotates therewith.

Turning now to the construction of the inner main housing section, this section includes a main support wall 70 which can be made of a suitably strong metal such as aluminum or aluminum alloy. This inner housing section also has a short peripheral wall 72, including a semi-circular wall section at 74 and a further semi-circular wall section at 76. It will be understood that short, straight wall sections extend between the two wall sections 74, 76. The peripheral wall 72 has an outer edge that extends along and engages the outer housing section 60. The inner housing section can be detachably connected to the outer housing section by means of threaded fasteners 81 which can be seen in FIGS. 1 and 5 to 8. The fasteners can extend through fastener holes that extend through outwardly projecting tabs 83 distributed about at least the semi-circular wall section 74 and through holes formed in integral protrusions or lugs 84 formed on the inner housing section 58. It will also be seen from FIG. 3 that the inner housing section 58 has fixedly mounted thereon a stub shaft member 90 which can include a circular end section 92 that is connected by four screws 94 to the inner housing section. The stub shaft member includes an outwardly projecting stub shaft 96 on which is rotatably mounted the second sprocket 50, the crank 18 and the pedal. A central hole 98 is formed in the second sprocket and the stub shaft extends into this hole. Two sets of ball bearings 100 and 102 are spaced apart and are mounted between the stub shaft and the second sprocket 50. The ball bearings 102 can rest against the inner side of the circular end section 92. A circular bearing support plate 104 can be attached to the enlarged inner end of the crank by means of a central screw 106. The plate 104 engages the inner side of the ball bearings 100 to hold them in place.

Figure 2:
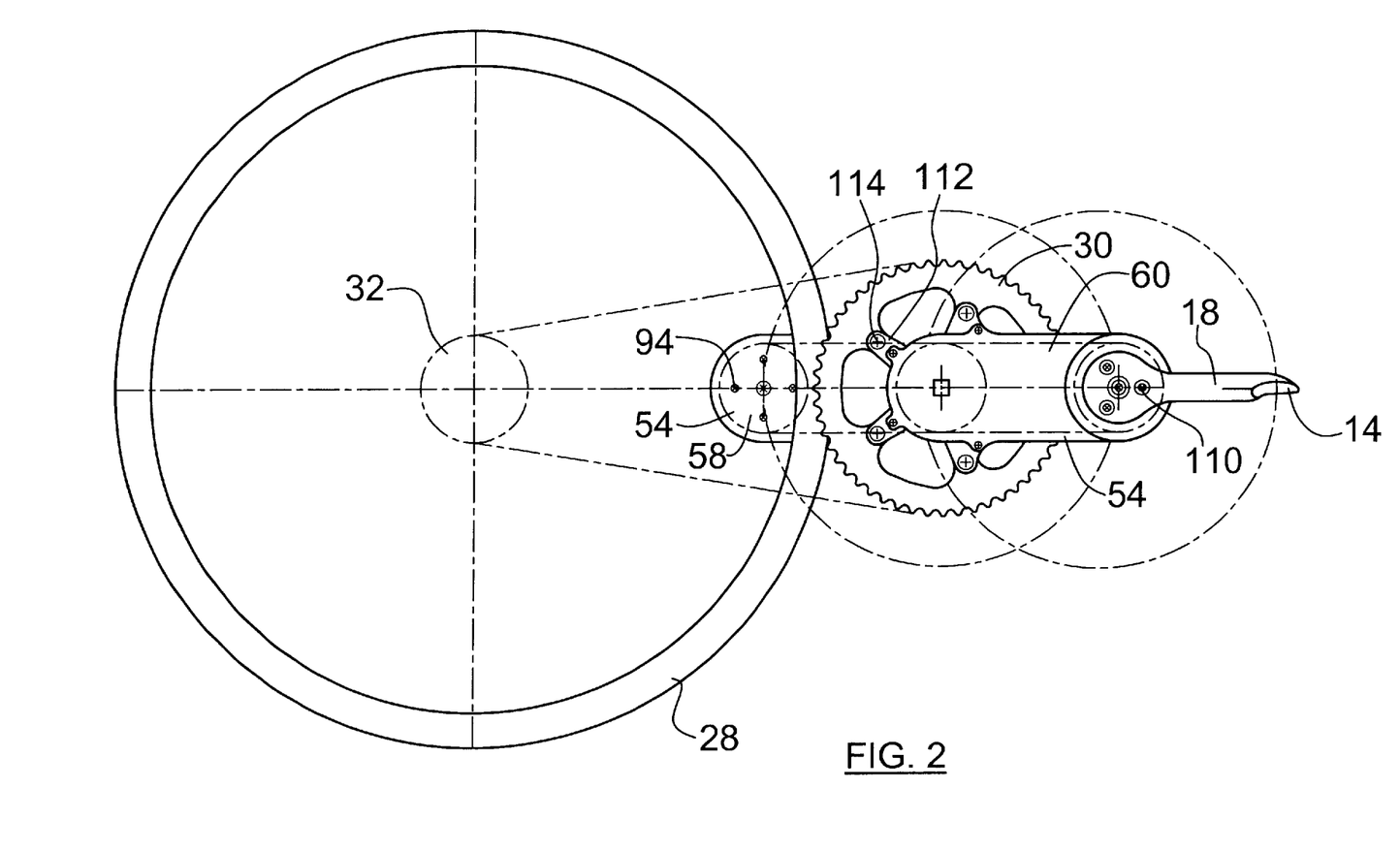
FIG. 2 is a schematic side elevation of the pedal-type driving device of the invention and the rear wheel of the bicycle, this view illustrating the orbital path of one pedal and the planetary sprocket to which the pedal is connected.

Although it is possible to integrally form the second sprocket 50 on its respective crank 18 as indicated by the dashed line separating these two members in FIG. 3, preferably these two members are formed separately and are rigidly connected to each other by means of two or three screws 110 that can be seen in FIGS. 1 and 2 and in FIGS. 5 to 8. These screws extend through holes formed in the crank 18 and into threaded holes formed in the second sprocket 50.

Figure 5:
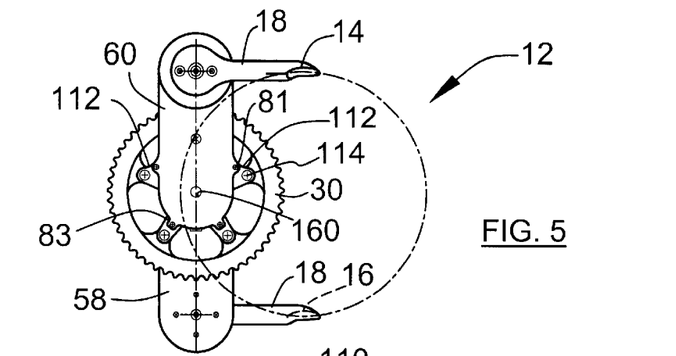
FIG. 5 is a schematic side view of the pedal-type driving device, including the chain sprocket, this view showing the pedals and their respective crank arms in their upper most and lower most positions.

The preferred manner of mounting the chain sprocket 30 can be seen in FIGS. 1 and 5. In particular, one inner housing section 58 is formed with a series of spaced apart lugs 112, each of which has a hole to accommodate a screw 114 that extends into a threaded hole formed in the side of the chain sprocket 30. Although the chain sprocket is not shown in FIG. 3, it will be understood that it is positioned so as to be coaxial with the main shaft 34 and located between the annular rib 42 and the adjacent side of the inner housing section 58.

In a preferred embodiment of the pedal-type driving device 12, each pedal 14, 16 is integrally and rigidly connected to its respective crank 18. Thus, the pedal 14, 16 can be made of the same metal as the crank and it can be molded or otherwise formed with the crank. One preferred metal for this purpose is aluminum or aluminum alloy because of its light weight. As will be clear hereinafter, one advantage of the present pedal type driving device is that there is no need for the foot pedals to be made rotatable with respect to their respective cranks 18. Because the pedals can be an integral extension of the crank, they can be made quite strong and durable and they are not subject to the breakage and maintenance problem of prior art rotatable pedals.

It should also be noted that in the pedal-type driving device 12, each crank 18 has a predetermined, fixed length and thus it can be made quite strong as there is no need for this member to vary in length as the driving device is rotated by the user's feet. Furthermore, each of the pedals 14, 16 is attached to the crank at a fixed location at an outer end of the crank 18. It follows that because the pedal can be fixedly attached to the crank, the pedal connection can be made quite strong and durable.

The planetary sprocket or second sprocket 50 has a central axis X of relative rotation and this axis is substantially parallel to the central axis A of the main drive shaft but is spaced therefrom. It will be appreciated from the above description and the following description of the operation of the driving device 12 as illustrated in FIGS. 5 to 8 that the second sprocket 50 is rotatable in an orbit around the central axis of the main drive shaft, this orbit having a constant radius. The result is that, when the vehicle or bicycle is driven, the distance of each pedal 14, 16 from the central axis of the main drive shaft is varied by its respective power transmission device or unit as the latter is rotated by its pedal and this distance is a maximum during a downward stroke of the pedal.

Figure 4:
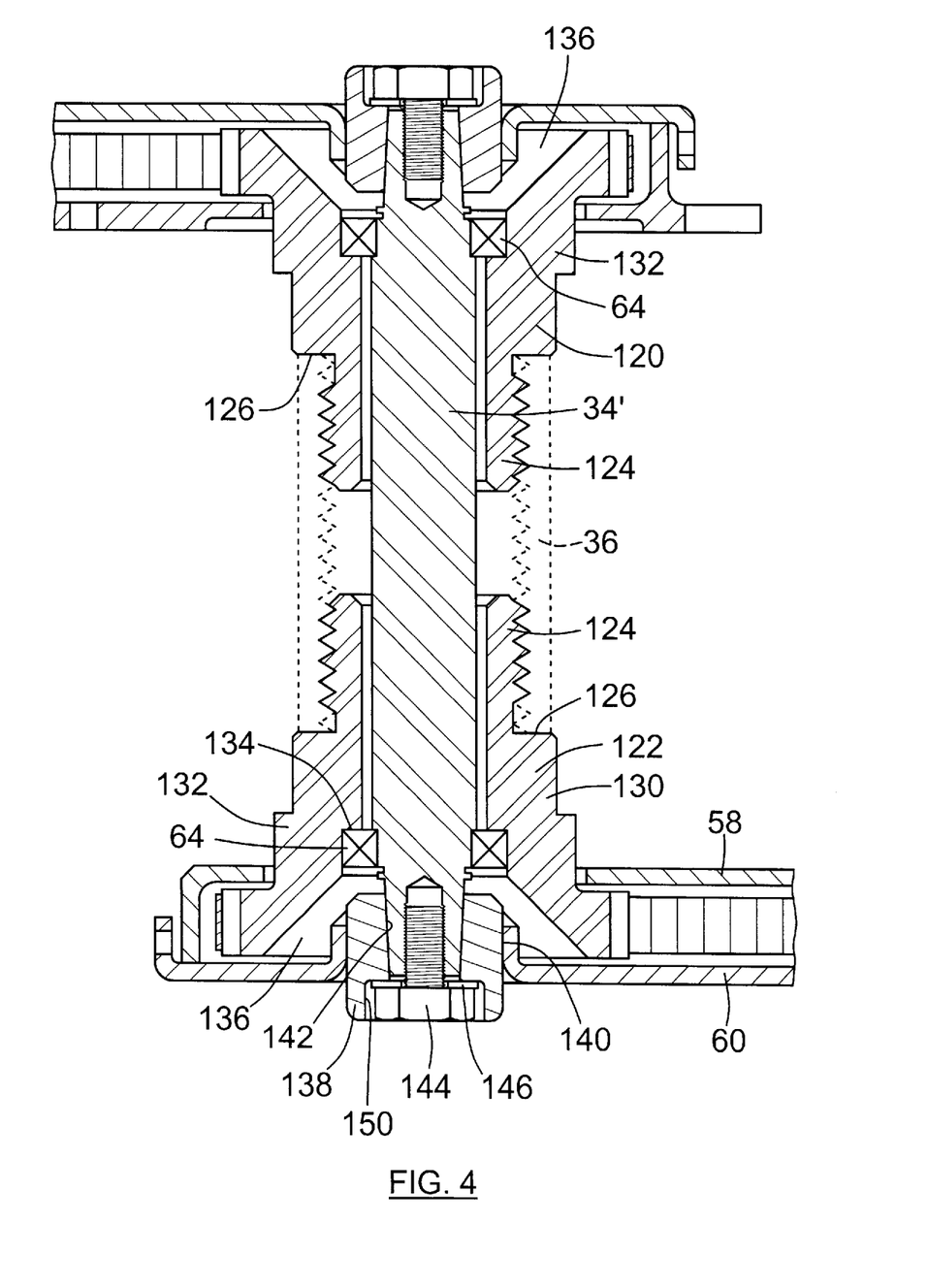
FIG. 4 is a cross-sectional view showing an alternate construction for the central portion of the pedal-type driving device of the invention, this view being taken along the axis of rotation of the main shaft.

FIG. 4 illustrates a preferred, alternate construction for the central portion of the driving device 12 of the invention. In this version, there are no separate bushings 38, 40. Instead, there are enlarged, fixed sprocket members 120, 122 each of which has a tubular extension 124 that is externally threaded. Thus, in order to attach each of these sprocket members to the bicycle sleeve 36 shown in dashed lines, it is threaded into the open end of the sleeve until the end of the sleeve engages against a shoulder 126 formed on the sprocket member. Thus this version requires that the sleeve 36 be internally threaded. The shoulder is formed by a sleeve section 130 which has a greater external diameter than the tubular extension 124 and which is not threaded. Next to the sleeve section 130 is an enlarged annular section 132 and it is in this section that the ballbearings 64 are mounted. There is an internal, outwardly facing shoulder at 134 against which one side of the bearings rest.

The outer end of each sprocket member 120, 122 is formed with a frusto-conical cavity 136. An outer end section of the main shaft 34' extends into this cavity as does an annular cap member 138. The cap member is inserted through a round aperture 140 formed in the outer housing section 60 A through passageway formed in the cap member is formed with a slightly tapered engagement surface 142 which engages a tapered surface formed on the end of the main shaft 34'. The cap member is held in place on the end of the shaft by means of a screw 144 and washer 146. The head of the screw and the washer are accommodated within an enlarged section 150 of the through passageway. It will be understood that the cap member 138 is rigidly and firmly connected to the outer housing section 60, for example, by welding. The chain sprocket 30 with this version can be mounted on one of the enlarged annular sections 132 immediately adjacent an inner housing section 58.

Turning now to the illustrations of FIGS. 5 to 8, these figures illustrate the manner in which the pedals 14, 16 and their respective cranks 18 move as they are operated by a person riding the bicycle. In FIG. 5, the pedal 14 is in its uppermost position while the pedal 16 is in its lowermost position. For both pedals, the attached crank extends horizontally. Each crank extends forwardly from its respective housing that encloses the timing belt. It will be particularly noted that in this position, the vertical distance between the pedals can be about the same as it is in a standard bicycle drive system.

Figure 6:
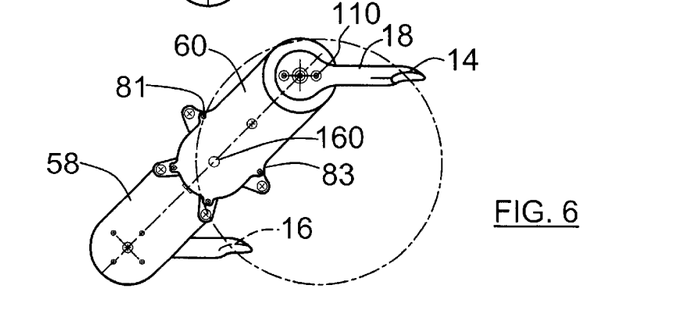
FIG. 6 is a schematic side view similar to FIG. 5 but omitting the chain sprocket, this view showing the two power transmission units at a 45 degree angle to vertical.

FIG. 6 shows the pedal-type driving device after it has been advanced about 45 degrees from the position of FIG. 5. In this position, the pedal 14 has moved forwardly and downwardly while the pedal 16 has moved upwardly and rearwardly. The user of the bicycle will be pressing downwardly on the pedal 14 and it will be appreciated that the amount of leverage that can be exerted on the main axle located at 160 is greater at this position than would be the case with a standard bicycle drive system. This is a direct result of the fact that the distance, particularly the horizontal distance between the pedal 14 and the main shaft is substantially greater at this 45 degree position than would be the case with a standard bicycle drive system. It should be noted also that the upwardly moving pedal 16 is no more difficult to reach for the foot of the user than with a standard bicycle drive system. Also in this 45 degree position, the orientation of the pedals remains unchanged and the cranks 18 remain horizontal.

Figure 7:
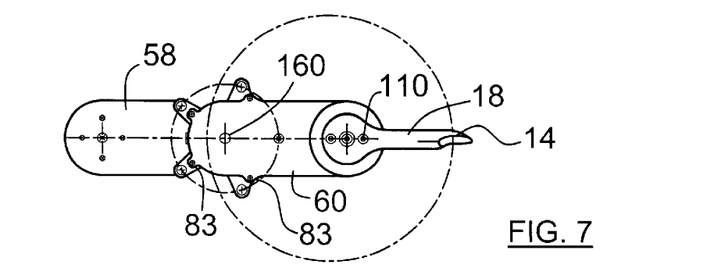
FIG. 7 is another schematic side view similar to FIG. 6 but showing the two power transmission units in horizontal positions.

Turning now to the position shown in FIG. 7, the pedal 14 is now in its forwardmost position and the pedal 16 (not shown) is in its rearwardmost position. Again, in this position, the orientation of each pedal remains unchanged and their cranks still extend horizontally. It will be appreciated that in this position, maximum leverage can be exerted by the bicycle rider on the drive shaft since the distance between the pedal 14 and the drive shaft located at 160 is a maximum and is substantially greater than that provided by a standard bicycle drive system.

Figure 8:
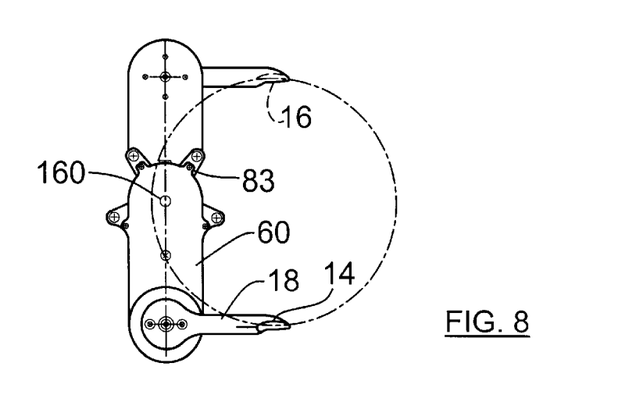
FIG. 8 is a schematic side view similar to FIG. 5 but showing the two power transmission units in their opposite vertical positions.

The position shown in FIG. 8 is one where the pedals 14, 16 have moved 180 degrees from the position shown in FIG. 5. In this view, the pedal 14 is in its lowermost position and the pedal 16 is in its uppermost position. Again, the orientation of the pedals has not changed and the cranks 18 remain horizontal. It will thus be appreciated that because the orientation of the pedals 14, 16 never changes during the full cycle of pedal operation, they can be fixedly attached to their respective cranks 18 and they need not be rotatable with respect to the cranks.

It will thus be seen that with the pedal-type driving device 12 of the invention, the distance of each pedal from the central axis located at 160 varies substantially as the pedals are moved relative to this central axis during use of the driving device. Furthermore, the pedals 14, 16 and their attached cranks 18 are able to provide greater rotational torque to the main shaft 34 during a driving phase of the rotation when the pedals are a greater distance from the central axis of the main shaft.

It will be understood that the bicycle drive system of the invention should be set up and mounted so that its operation will not interfere with the turning movement of the front wheel of the bicycle. For this reason, it may be desirable with some bicycle configurations to move the location of the support sleeve 36 back by a short distance (for example, three to four inches) from where it would be located with a standard bicycle drive system. However, the height of the support sleeve 36 can remain the same in a bicycle outfitted with the drive system of the invention. Alternatively, instead of moving the sleeve three to four inches rearwardly on the bicycle frame, it is also possible to move the front wheel 26 a few inches forwardly.

Because of the greater rotational torque that can be applied to the chain sprocket 30 with the drive system of the invention, if desired, the chain sprocket 30 can be made larger than a standard chain sprocket. For example, it is possible to use a chain sprocket having 54 teeth rather than a standard sprocket having about 48 teeth. A larger chain sprocket of this type is currently available and can be purchased as an off the shelf item. It has a slightly larger diameter than a standard bicycle chain sprocket.

With respect to the ball bearings used in the preferred pedal drive system as described above, these ball bearings can be permanently sealed so there is no requirement for lubrication of the bearings during the life of same.

Although it is possible to make the housing which covers the timing belt from aluminum or aluminum alloy, the preferred material is stainless steel because of its combined characteristics of substantial strength and resistance to corrosion.

It will be apparent to those skilled in the art of bicycle drive systems that various modifications and changes can be made to the illustrated and described pedal-type driving device without departing from the spirit scope of this invention. Accordingly, all such modifications as fall within the scope of the appended claims are intended to be included in this invention.

What is claimed is:

1. A driving device suitable for a bicycle, said driving device comprising:

a main shaft having first and second ends and rotatable about a central axis thereof;

a chain sprocket adapted for mounting about said main shaft in a coaxial manner for rotation therewith, said chain sprocket being engageable with a chain to drive a wheel of said bicycle; and two power transmission units each of which is mounted at a respective one of said first and second ends of said main shaft, each of said transmission units comprising a non-rotating first sprocket connectible to an adjacent support structure of the bicycle during use of the driving device, a rotatable, planetary, second sprocket spaced radially outwardly from the first sprocket, a pedal, a crank connecting said pedal to said second sprocket, a flexible, continuous drive member extending around and between said first and second sprockets and adapted to engage said second sprocket, a sprocket supporting member fixedly attached to a respective one of said ends of the main shaft and attached to and supporting said second sprocket so as to allow rotation of said second sprocket relative to said supporting member by means of said continuous drive member, wherein said chain sprocket is adapted for mounting on one of said power transmission units for rotation with the sprocket supporting member of said one power transmission unit and wherein the distance of each pedal from said central axis varies substantially as the pedals are moved relative to said central axis during use of said driving device and said pedals and their attached cranks are able to provide greater rotational torque to said main shaft during a driving phase of their respective rotations when each pedal is at a greater distance from said central axis.

2. A driving device according to claim 1 wherein the sprocket supporting member of one of said transmission units is connectible by threaded fasteners to one side of said chain sprocket.

3. A driving device according to claim 2 wherein said sprocket supporting member is a relatively flat housing that surrounds its respective continuous drive member and said first sprocket.

4. A driving device according to claim 1 wherein said continuous drive member is a timing belt formed with a continuous series of teeth on an inner side of the belt.

5. A driving device according to claim 1 including two sets of ball bearings for rotatably mounting said main shaft in non-rotating bushings adapted for mounting in a supporting sleeve of a bicycle frame, each set of ball bearings being mountable adjacent a respective one of said first and second ends of the main shaft.

6. A driving device according to claim 5 wherein said first sprocket is fixedly mounted on an outer end section of a respective one of said bushings.

7. A driving device according to claim 6 wherein said first sprocket is fixedly mounted by a press fit on its respective bushing.

8. A driving device according to claim 3 wherein said housing comprises inner and outer main housing sections, said outer main housing section is fixedly attached to a respective one of said first and second ends of said main shaft, and said inner and outer main housing sections are secured to one another by threaded fasteners.

9. A driving device according to claim 1 wherein said pedal is integrally and rigidly connected to its respective crank.

10. A driving device according to claim 9 wherein said second sprocket is fixedly connected to said crank and is rotatably mounted on ball bearings and wherein said sprocket supporting member includes a stub shaft member that extends into a central hole formed in said second sprocket, said ball bearings being mounted between said stub shaft member and said second sprocket.

11. A driving device comprising:

a main shaft having first and second ends and rotatable about a main central axis thereof;

a chain sprocket coaxial with said main shaft and mounted for rotation with said main shaft, said chain sprocket being adapted to drive a continous drive chain;

two power transmission units each of which is mounted at a respective one of said first and second ends of said main shaft, each of said power transmission units including an elongate crank member having a predetermined, fixed length, a pedal attached to the crank member at a fixed location at an outer end of said crank member, a flexible, continuous drive member, a planetary sprocket fixedly attached to an opposite end of said crank for movement therewith and operatively connected to said continuous drive member, said planetary sprocket having a central axis, which is substantially parallel to said main central axis but spaced therefrom, and being rotatable in an orbit around said main central axis upon movement of its respective pedal, and a non-rotating sprocket coaxial with said main shaft and operatively connected to said continuous drive member, wherein the distance of each pedal from said main central axis is varied by its respective power transmission unit as each pedal is moved about said main central axis.

12. A driving device according to claim 11 wherein each power transmission unit includes a rotatable, sprocket-supporting member on which said planetary sprocket is mounted for relative rotation therewith, and one of the sprocket supporting members is fixedly connected to one side of said chain sprocket.

13. A driving device according to claim 11 wherein each pedal is fixedly and non-rotatably connected to its respective crank member.

14. A driving device according to claim 13 wherein each pedal is made of a suitably strong metal and is integrally connected to its respective crank member.

15. In a foot-powered, wheeled vehicle having a supported frame, a steerable front wheel, and at least one driven rear wheel connected to at least one driven sprocket for rotation therewith, a main drive shaft rotatably mounted in said support frame and having first and second ends, a chain sprocket coaxial with said drive shaft and mounted for rotation with said drive shaft, a continuous chain extending between and operatively connecting said chain sprocket and said at least one driven sprocket, the improvement comprising:

two power transmitting devices each of which is mounted at a respective one of said first and second ends of said drive shaft, each of said power transmitting devices, including an elongate crank member having a fixed length, a pedal attached to the crank member at a fixed location at an outer end of the crank member, and a sprocket fixedly attached to an opposite end of said crank for movement therewith, said sprocket having a central axis of relative rotation, which is substantially parallel to a central axis of said main drive shaft, but is spaced therefrom, and being rotatable in an orbit around said central axis of the main drive shaft, wherein, when the vehicle is driven, the distance of each pedal from said central axis of the main drive shaft is varied by its respective power transmitting device as the latter is rotated by its pedal and reaches a maximum distance during a downward stroke of the pedal, wherein, each power transmitting device further includes a continuous timing belt that extends around and is operatively connected to said sprocket and a non-rotatable, second sprocket that is coaxial with said main drive shaft and is fixedly connected to said support frame, said timing belt extending around and being operatively connected to said second sprocket.

16. A wheeled vehicle according to claim 15 wherein each pedal is fixedly and non-rotatably connected to its respective crank member.

17. A wheeled vehicle according to claim 15 wherein each power transmitting device further includes an elongate sprocket supporting member fixedly attached to a respective one of said first and second ends of the main drive shaft and attached to and supporting the first mentioned sprocket so as to allow rotation of this sprocket relative to the sprocket supporting member.

18. A wheeled vehicle according to claim 17 wherein each sprocket supporting member comprises an elongate, relatively flat housing that encloses and protects both said timing belt and said second sprocket.

* * * * *